United States Patent [19]
Borgatti

[11] Patent Number: 5,435,411
[45] Date of Patent: Jul. 25, 1995

[54] WORK SUPPORT STAND

[75] Inventor: Anthony J. Borgatti, East Longmeadow, Mass.

[73] Assignee: Power Tools Specialists, Inc., East Windsor, Conn.

[21] Appl. No.: 290,545

[22] Filed: Aug. 15, 1994

[51] Int. Cl.$^6$ .................. F16M 11/00; B25H 1/00
[52] U.S. Cl. .................... 182/181; 144/287; 269/289 MR
[58] Field of Search .............. 182/181, 182, 224; 193/42; 269/289 MR; 144/286, 286 A, 287

[56] References Cited

U.S. PATENT DOCUMENTS

| | | | |
|---|---|---|---|
| 4,974,651 | 12/1990 | Carmon et al. | 144/287 X |
| 5,247,976 | 9/1993 | Matthews | 144/287 |
| 5,299,656 | 4/1994 | Grill | 269/289 MR |
| 5,337,875 | 8/1994 | Lee | 269/289 MR |

FOREIGN PATENT DOCUMENTS 1208363 10/1970 United Kingdom ............... 144/287

*Primary Examiner*—W. Donald Bray
*Attorney, Agent, or Firm*—Chapin, Neal & Dempsey

[57] ABSTRACT

A dual purpose roll work stand, adapted to support elongated material and permit the user to easily move the material across the stand surface, includes a base member mounted to a vertical support which can be adjusted to raise or lower the height thereof, a row of discrete ball bearing units mounted to the upper surface of the base member to permit the material rested thereon to be move in any direction and a roller disposed between two brackets that are rotatably secured to the ends of the base by two knurled knobs. The roller may be positioned directly above the upper surface of the base to support the material thereon and moved unidirectionally perpendicular to the axis of the roller. The brackets may be rotated from the upright position along side the base to allow the material to be supported on the ball bearing units and moved omnidirectionally.

8 Claims, 2 Drawing Sheets

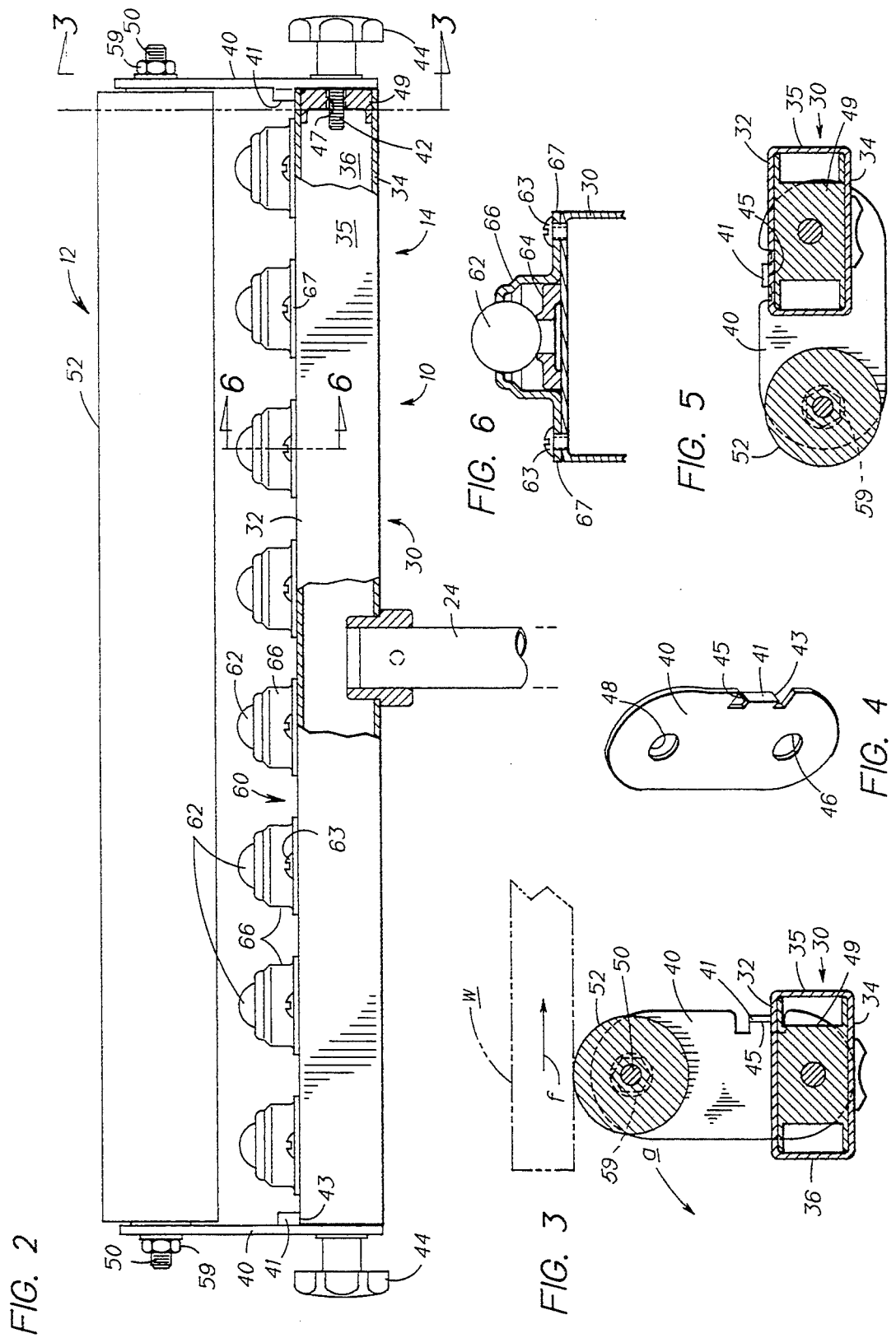

WORK SUPPORT STAND

FIELD OF THE INVENTION

This invention relates to a work support stand for supporting and feeding workpieces to various types of machine tools and more particularly, to such stands which have the capability of being readily configured for selectively supporting various types of workpieces of different sizes, shapes, surface characteristics, weight and/or material.

BACKGROUND OF THE INVENTION

Machinery such as table saws, drill presses, and milling machines are used to carry out various finishing operations, such as shaping, sizing or sanding of a variety of materials. The feeding of very lengthy or oversized materials will frequently pose some difficulties for the tool operators because the limited work support surfaces of such tools are generally of limited size. As a result, such oversize workpieces would usually require additional operator assistance to help support the outer end portions of such materials as they are being fed to the operating tool to ensure that the material is properly oriented for the machining operation to be carried out. Various types of support stands have been available for feeding such lengthy material stock. One such stand has a roller with a horizontal axis that provides for a rolling line contact generally perpendicular to the direction of movement of the work. Another type includes a plurality of closely spaced ball bearings mounted so that the work, such as a plywood sheet, is movable on the bearings with at least two directions of freedom of movement, i.e., longitudinal and lateral motion. Typically, the work stand is placed a predetermined distance from the machine and the height thereof is adjusted to approximately the height of the working surface of the machine to support the elongated or oversized material thereon.

Work support stands of the ball bearing type are disclosed in U.S. Pat. Nos. 1,251,881; 2,237,615; and 4,381,054, permits smooth movement of the workpiece in varying directions as it is being fed to the machine. With certain heavy materials which may have a soft outer surface subject to being easily marred, the fact that each of the ball bearings may be fabricated of hard steel and make only point contact with the work, there is a tendency for the material to be marred, as by grooves or indentations, as the workpiece is moved over the stand.

The work stand that includes a roller disposed upon a frame or vertical support, as disclosed in U.S. Pat. Nos. 3,083,806 and 4,039,679, provide for only unidirectional movement of the workpiece which is perpendicular to the axis of the roller. Although the roller type work support stand, because of its greater surface area of contact with a workpiece is less likely to mar the surface thereof, has the tendency to maintain the movement of the workpiece in a single direction and therefore assists the user to guide the material in the desired direction.

U.S. Pat. No. 2,818,092 discloses a universal work support characterized by a plurality of pivotable castors. This patent purports to have almost the same advantages and capabilities as the ball bearing work stand without causing the contacting surface of the material to be marred as by grooves or indentations being caused by movement of the material on top of the castor wheels. To ensure smooth operation, it is essential that the castor wheels be aligned with the direction of movement of the material thereacross. In that connection, any hitch in the pivotable movement of the wheels can result in a drag on the material being moved thereover.

SUMMARY OF THE INVENTION

Accordingly, it is the primary object of the present invention to provide a work support stand having the dual capability of supporting different types of materials for selective unidirectional and omnidirectional movement thereover.

It is another object to provide a work support stand which can be readily interchanged easily between a unidirectional support surface and an omnidirectional work support surface and without removal of either surface from the stand.

It is yet another object to provide a work support stand having discrete roller and ball bearing work support surfaces mounted for selected orientation for use at any time as the work support surface.

According to the present invention, an improved work support stand for supporting an elongated workpiece to be fed into or away from a machine and providing a low friction surface for easy movement of the workpiece thereover includes two work supporting members, one of which provides for omnidirectional movement of the workpiece and the other for unidirectional movement thereof, and a means to selectively orient one supporting member in a position to engage the workpiece and the other supporting member in a position clear of the workpiece.

The above and other objects and advantages of this invention will become more readily apparent when the following description is read in conjunction with the accompanying drawings.

BRIEF DESCRIPTION OF THE DRAWINGS

FIG. 2 is a partial elevational view of the preferred embodiment of FIG. 1;

FIGS. 3 is a cross-sectional view of the preferred embodiment taken along the line 3—3 of FIG. 2;

FIG. 4 a perspective view of one of the roll support brackets as used in the embodiment of this invention;

FIG. 5 is a cross-sectional view taken along line 3—3 of FIG. 2 configured with the work support surfaces disposed in different operative relationships than FIG. 3; and FIG. 6 is an enlarged cross-sectional view taken along line 6—6 of FIG. 2.

DETAILED DESCRIPTION OF THE PREFERRED EMBODIMENT

Figure 1:
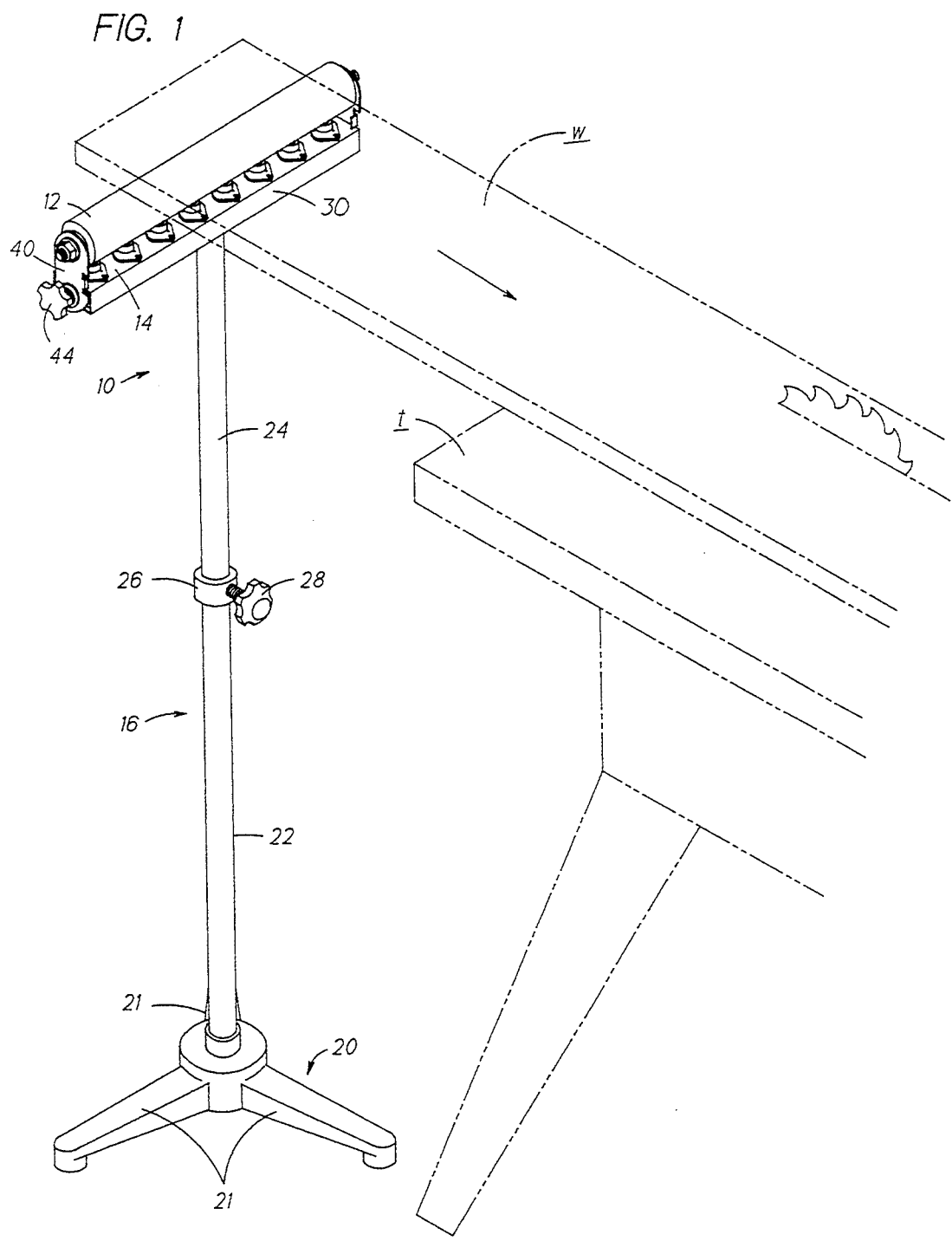
FIG. 1 is a perspective view of the preferred embodiment of the present invention, as illustrated, being used for one of its intended purposes.

Referring to FIG. 1, a work support stand 10 is shown disposed adjacent a table saw type cutting tool t and which comprises a plurality of discrete work supporting surfaces or members 12 and 14 disposed on post 16 which extends upwardly from a ground engaging base 20. The post 16 includes a lower tubular portion 22 having its lower end secured to the base 20 and a rod 24 telescopically fitted into the lower tubular portion 22. A collar 26 is disposed on the upper edge of the tube 22 and a set-screw extends through the collar 22 and a knurled knob 28 at its outer end facilitates height adjustments of work supporting surfaces 12 or 14 to a predetermined height in the plane of the working tool, as depicted at t in FIG. 1.

The ground engaging base 20, as shown in FIG. 1, may be of generally circular shape and includes a plurality of radially extending foot portions 21. The base 20 should be of sufficient size and weight to provide sufficient stability to enable the stand 10 to remain in a fixed and stable orientation while supporting workpieces w of various shape, size, weight and composition for movement thereover.

The work supporting members 12 and 14 are disposed on the rod 24 in such a manner so that each of the members is available and may be readily selected to be used to support the work w being fed to or from the working tool t. As shown in FIGS. 1 and 2, the members 12 and 14 are both supported by a base member 30 of generally rectangular configuration which includes an upper panel 32, lower panel 34 and front and rear walls 35 and 36. The upper panel 32 of the base 30 serves as the mounting means for a plurality of discrete ball bearings 62, while the base 30, as a whole, serves as means for supporting the roll type work support 12. A pivotable mounting plate or bracket 40 is disposed at each end of the base 30 and each is secured in position thereon by means of a screw threaded fastener 42 with a knurled knob 44 at its outer end and which extends through an opening 46 (FIG. 4) adjacent the lower edge of each plate 40 and which is adapted to be screwed into a threaded bore 47 through the upright wall portion of a U-shaped fitting 49 disposed within the open ends of the rectangular frame 30. Another opening 48 extends through each plate or mounting bracket 40 adjacent the upper edge thereof for receiving the outer ends of a shaft or axle 50 about which the support member 12, in the form of roll 52, is rotatably mounted on a suitable bearing (not shown), such as ball bearings, disposed between the roll and axle 50. The support member 12 is secured to the mounting brackets 40 by hexagonal nuts 59 threaded onto the outer ends of the axle 50. Each of the mounting brackets or plates 40 includes a tab or tongue 41 that extends inwardly and generally perpendicular to the plane of the plate and is located so that its lower edge 43 is adapted to engage the upper surface of the upper panel 32 of the base 30. This construction ensures that the plates 40 will remain upright to support the roll 52 in position for supporting workpieces w for feeding into the working tool t with the tab disposed on the side of the work support 10 adjacent the working tool. In that way, any clockwise torque applied to the brackets 40 as a result of movement of the work w over the roll 52, as depicted at f in FIG. 3, will not result in movement of the brackets since they are securely maintained in their upright positions by the tabs 41. On the other hand, should the operator desire to change from using the unidirectional roll support 52 to the multiple and omnidirectional ball bearing work support 60, it is a simple matter to loosen the threaded fasteners 42 and then move the roll 52 and brackets 40 counterclockwise as represented by the arrow a in FIG. 3. In the latter position, the inner surface 45 of the tab 41 will engage the upper surface 32 of the base 30, as in FIG. 5, to hold the roll member 52 at an orientation generally at a right angle to its work engaging upright position but at a level clear of the workpiece w supported by the ball bearings 62.

The ball bearing work support surface 60 comprises a plurality of discrete ball bearings 62 disposed in spaced relation along the length of the upper plate or panel 32 of the base 30. Each of the ball bearings 62 is disposed in a bushing or seat member 64 (FIG. 6) disposed on the upper surface of the upper panel 32. A housing 66 is fitted over each of the ball bearings 62 and seats 64 to secure the bearings onto the panel 32 in spaced relation therealong. The housing 66 has a circular opening of slightly smaller diameter than that of the ball bearings 62 to enable the upper portion of said bearing to extend rotatably from the housing while being retained therein. The housing includes, at its lower end, a generally planar base with diametrically opposed flanges 67 adapted to receive screws 63 therethrough to secure each ball bearing assembly to the upper surface of the panel 32. The bearings 62 are each movable omnidirectionally and, being discretely mounted, can be replaced individually should one become worn or damaged.

The stand 10 is adapted to assist an individual to feed in and/or guide out workpieces w of substantial length for performing various types of machine operations such as cutting, shaping, planing, sanding or the like. In any case, the work support members 12 and 14 which embody this invention provide the most versatile and economical apparatus available to support the portions of the workpiece w which extend beyond the working surface of the machine t and selectively providing uni or omnidirectional and low frictional movement of the workpiece in the machine area.

To operate the work stand 10, it is placed at a predetermined distance from the machine t to support the end of the workpiece w that extends beyond the work surface of the machine and with the front wall 35 of the base 30 disposed facing the machine as in FIG. 1 or away from the machine if used to assist in the guiding off of the work (not shown). The roll 52 is then positioned either in upright or horizontal orientation by using the knobs 44. In the latter case, the ball bearings 62 would be positioned for work support while in the former case, the roll 52 would be so positioned. The height of the base 30 may then be adjusted using the set-screw knob 28 so that the level of either the roll 52 or ball bearings 62, selected for supporting the particular workpieces to be machined, will correspond to the height of the work surface of the machine.

Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described my invention, what is claimed is:

1. An improved work support stand of unitary construction for support and movement of a workpiece into or away from a machine in varying directions comprising a first work supporting member, a second work supporting member in juxtaposition on said stand, each of said members including an operative position adapted to engage the work for supporting and an inoperative position clear of the work, and means for selectively reorienting said first work supporting member to position the one member in the operative position and the other to the inoperative position on said stand.

2. An improved work support stand as set forth in claim 1, and wherein the work support stand further comprises a base that includes a panel.

3. An improved work support stand as set forth in claim 2, and wherein the means comprises a pivotal bracket disposed on said base for supporting one of said work supporting members for movement relative to the other supporting member between said operative and inoperative position.

4. An improved work support stand as set forth in claim 3, and wherein the brackets include a tab that extends therefrom to engage said upper panel and to support the same in said operative position and inoperative position.

5. An improved work support stand as set forth in claim 4, and wherein the second work supporting member is in the form of a roll-type member.

6. An improved work support stand as set forth in claim 5, and wherein the first work supporting member comprises a plurality of discrete ball bearing units mounted along said upper panel of said base member.

7. An improved work support stand as set forth in claim 6, and wherein the ball bearing units comprise a seat having a hole centrally disposed therethrough that engages said upper panel of said base, a ball bearing disposed upon said seat, and a housing secured to said upper panel to retain said seat and ball bearing in fixed space relation, said housing having an opening of smaller diameter than the diameter of said ball bearing to allow said ball bearing to rotatably extend through said opening while retaining said ball bearing and said seat therein.

8. An improved work support stand as set forth in claim 6, and wherein the base is secured to a ground engaging vertically adjustable support.

* * * * *

UNITED STATES PATENT AND TRADEMARK OFFICE
CERTIFICATE OF CORRECTION

PATENT NO.   : 5,435,411
DATED        : July 25, 1995
INVENTOR(S)  : Anthony J. Borgatti It is certified that error appears in the above-indentified patent and that said Letters Patent is hereby corrected as shown below:

Title page, Item [73] Assignee: line 1 please delete "Tools" and substitute --Tool--

Signed and Sealed this

Fourteenth Day of May, 1996

Attest:

BRUCE LEHMAN

*Attesting Officer*     *Commissioner of Patents and Trademarks*

(12) EX PARTE REEXAMINATION CERTIFICATE (6567th)
United States Patent
Borgatti

(10) Number: US 5,435,411 C1
(45) Certificate Issued: Dec. 16, 2008

(54) WORK SUPPORT STAND

(75) Inventor: Anthony J. Borgatti, East Longmeadow, MA (US)

(73) Assignee: Power Tool Specialists, Inc., East Windsor, CT (US)

Reexamination Request:
No. 90/006,162, Dec. 17, 2001

Reexamination Certificate for:
Patent No.: 5,435,411
Issued: Jul. 25, 1995
Appl. No.: 08/290,545
Filed: Aug. 15, 1994

Certificate of Correction issued May 14, 1996.

(51) Int. Cl.
*F16M 11/00* (2006.01)
*B25H 1/00* (2006.01)

(52) U.S. Cl. ............. 182/181.1; 144/287; 269/289 MR

(58) Field of Classification Search ............... 182/181.1; 269/289 MR; 144/287
See application file for complete search history.

(56) References Cited

U.S. PATENT DOCUMENTS

| | | | |
|---|---|---|---|
| 1,251,881 A | 1/1918 | Goodwin | |
| 1,390,487 A | * 9/1921 | Black et al. | 269/289 MR |
| 1,760,304 A | 5/1930 | Feldin | |
| 2,237,615 A | 4/1941 | Roberts | |
| 2,818,092 A | 12/1957 | Grosset | |
| 3,083,806 A | 4/1963 | Haines | |
| 4,039,064 A | 8/1977 | Kirby | |
| 4,381,054 A | 4/1983 | Rumpel | |
| 5,462,102 A | * 10/1995 | Searfoss | 144/287 |

FOREIGN PATENT DOCUMENTS

TW 81202836 3/1992

* cited by examiner

*Primary Examiner*—Alvin C Chin-Shue

(57) ABSTRACT

A dual purpose roll work stand, adapted to support elongated material and permit the user to easily move the material across the stand surface, includes a base member mounted to a vertical support which can be adjusted to raise or lower the height thereof, a row of discrete ball bearing units mounted to the upper surface of the base member to permit the material rested thereon to be move in any direction and a roller disposed between two brackets that are rotatably secured to the ends of the base by two knurled knobs. The roller may be positioned directly above the upper surface of the base to support the material thereon and moved unidirectionally perpendicular to the axis of the roller. The brackets may be rotated from the upright position along side the base to allow the material to be supported on the ball bearing units and moved omnidirectionally.

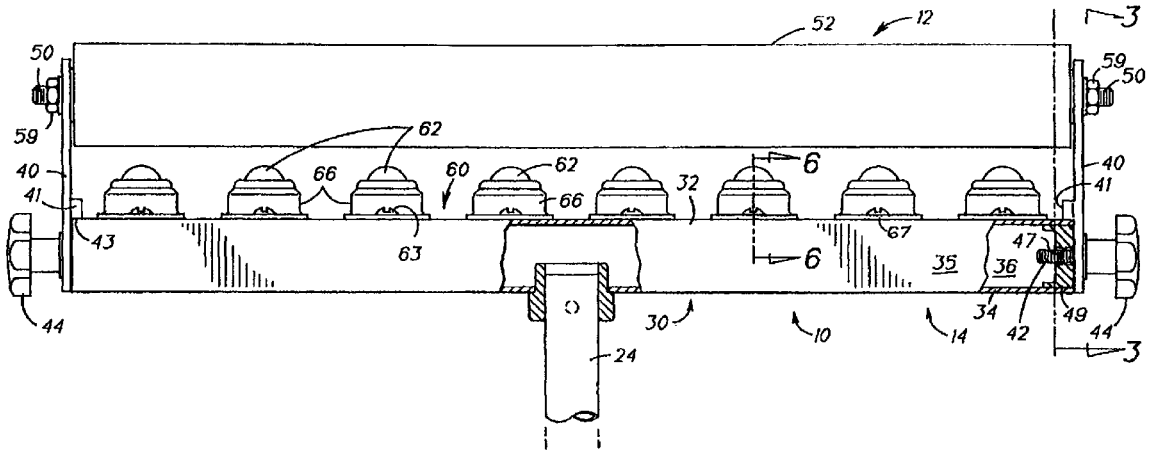

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–8 are cancelled.

* * * * *